Jan. 24, 1967 C. STRAUB 3,300,604
STOP LIGHT SWITCH FOR VEHICLES
Filed April 26, 1965
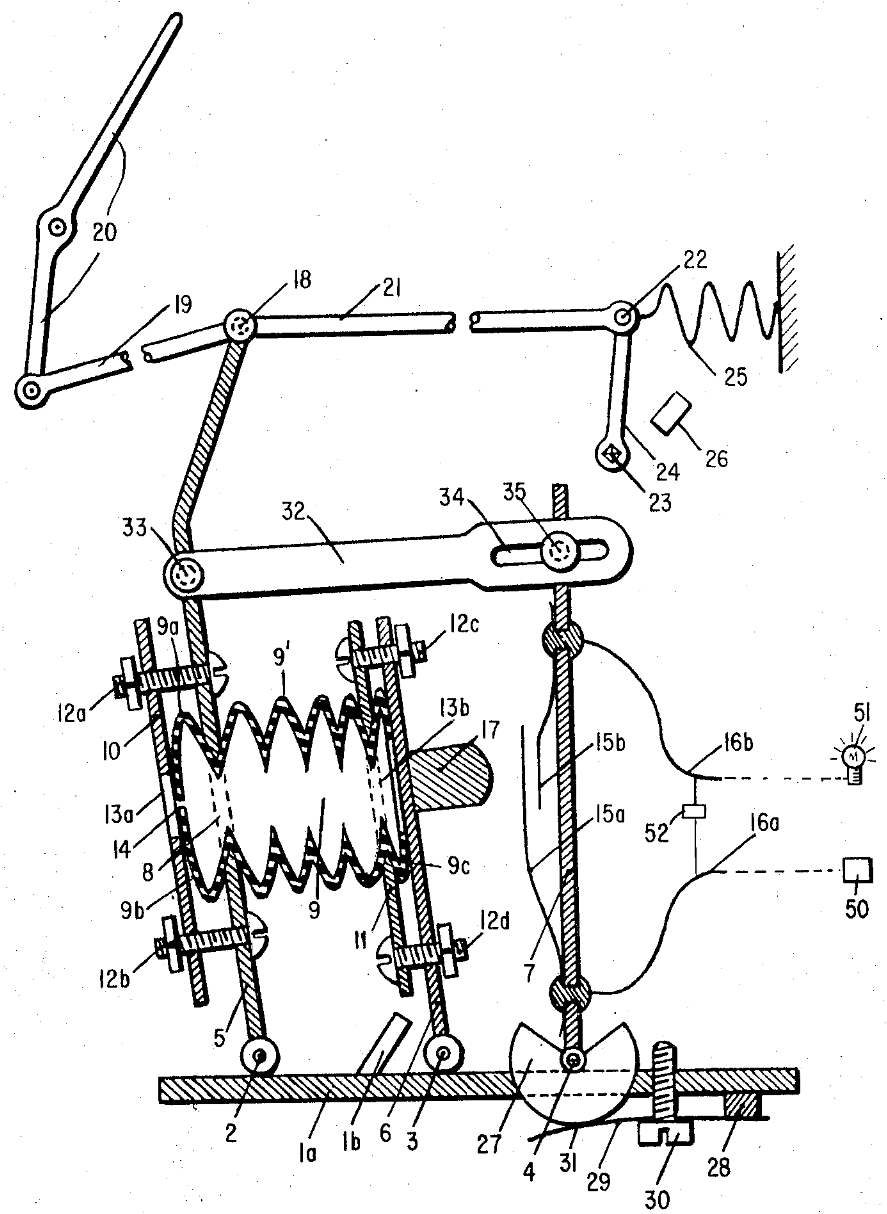
INVENTOR:
Carl Straub
By Werner W. Kleeman
His Attorney United States Patent Office 3,300,604
Patented Jan. 24, 1967

3,300,604
STOP LIGHT SWITCH FOR VEHICLES
Carl Straub, Zurich, Switzerland, assignor to Brevetti Omnitec, Milan, Italy
Filed Apr. 26, 1965, Ser. No. 450,762
Claims priority, application Switzerland, Apr. 27, 1964, 5,502/64
10 Claims. (Cl. 200—61.89)

The present invention has reference to an improved stop or brake light switch for vehicles, particularly automobiles.

The nowadays conventional, obligatory brake or stop light switches for vehicles, especially automobiles, are composed of a contact mechanism controlled by the brake pedal in such a manner that each time the brake pedal is actuated the switch makes contact. As a result, current flows from the automobile battery to the signal lamps mounted at the rear end of the vehicle and causes such to light up. When the brake pedal is released the flow of current to the signal lamps is interrupted so that they again extinguish. It will thus be appreciated that the brake lights first illuminate as a warning signal for the driver of the trailing car when the braking action has been initiated, that is, during slowing down of the vehicle. An important disadvantage of this widespread warning technique essentially resides in the fact that warning comes too late, and that when braking the vehicle with the motor by means of the lower gears no warning whatsoever occurs. Consequently, with bad visibility due for instance to rain, fog, snowstorms, twilight and at night, as well as also with icy roads, inattentiveness during driving and so forth, there often occur mass collisions where entire columns or chains of vehicle "pile up." Thus, the presently employed stop or brake light switches are not appropriate for the requirements of present day traffic conditions, particularly are not accommodated to the number of vehicles, speed, the shorter spacing between the individual vehicles and the more effective braking action in comparison to former times.

It would be more proper to mechanically register the first reaction of the forward driver to an accident or otherwise, braking or only more pronounced speed reduction or also to increased attentiveness required by the traffic conditions and to simultaneously automatically transmit such to the brake lights. As a result, the drivers of the following vehicles would receive an earlier warning and, therefore, could carry out their own braking action sooner and possibly also more gently. Consequently, individual and mass chain collisions would be prevented, reduced, or at least their effect considerably alleviated.

Accordingly, it is a primary object of the present invention to provide an improved stop or brake light switch for vehicles which provides an earlier warning to trailing vehicles than given nowadays by conventionally employed brake light systems.

Another more specific object of this invention has reference to an improved switch for the automatic actuation of the brake or stop lights of vehicles which causes the stop lights to light-up when the gas pedal is quickly released, however, not when the gas pedal is released slowly, so that depending upon the reaction of the driver, the stop lights illuminate approximately one-half to one second sooner than with nowadays conventional devices.

These and still further objects of the invention are implemented by means of the inventive stop light switch in that, of three holder elements which are operatively connected with a housing portion and are successively arranged behind one another, are movable conjointly and towards one another, the middle one of such holder elements is connected via an elastic or resilient body member with one or both outer holder elements which, in turn, is connected by an entrainment member with the third holder element constructed as a trailing or drag contact.

Other features, objects and advantages of the invention will become further apparent by reference to the following detailed description and drawing where the single figure illustrates, by way of example and not limitation, a longitudinal cross-sectional view through the central axis of a preferred embodiment of inventive stop light switch arrangement.

Describing now the exemplary embodiment depicted in the drawing, it will be seen that three plates 5, 6 and 7 constructed as three support or holding elements are pivotably mounted upon a base plate 1*a* providing a housing portion by means of hinge connections or joints 2, 3 and 4 respectively. The plate 7, or at least a portion of the same which carries the electric contact means in the form of contact lamellae or blades 15*a* and 15*b*, is formed of electric insulating material of any suitable type. A substantially circular opening 8 is formed in the plate 5 and concentric to this opening between both of the plates 5 and 6 there is inserted a compressible and expandable hollow body 9' which is arranged substantially axially parallel to the base plate 1*a*. In the illustrated embodiment this hollow body 9' is defined by the bellows 9 formed of rubber or plastic material, for instance. It will be seen that bellows 9 is closed at the side of the plate 5—with the exception of a regulating valve arrangement to be considered shortly—at the other side it is open. Connection of the bellows 9 to both plates 5 and 6 is effected by pressing contact by means of two mounting plates 10 and 11. Each of these plates 10 and 11 is provided at its central region with a circular or round opening, namely opening 13*a* for the plate 10 and opening 13*b* for the plate 11. The first bellows portion 9*a* at the closed side of the bellows 9 is introduced into the opening 13*a* and the outermost fold portion 9*b* is pressed against the plate 5 by mounting and fixedly attaching the plate 10. Fixing of plate 10 is carried out by tightening the screws 12*a* and 12*b*. In analogous manner the last fold portion 9*c* at the other end of the bellows 9, after introduction through the opening 13*b*, is pressed against the plate 6 by fixedly clamping the plate 11, this occurring by tightening the screws 12*c* and 12*d*. In so doing, there is simultaneously attained an airtight sealing of the bellows 9 at the plate 6.

In the drawing the plates 10 and 11 are shown in loose condition prior to tightening the screws 12*a* to 12*d* in order that there can be clearly recognized the manner in which both ends of the bellows 9 can be fixedly clamped between two respective pairs of plates 5, 10 and 6, 11. The plate 10 exposes by means of its opening 13*a* a portion of the closing frontal wall of the bellows 9. In this exposed portion of the frontal wall there is piercingly formed one or more fine needle holes 14 which piercingly extend throughout the thickness of the frontal wall and provide regulating valve means. Needle hole or holes 14 thus serve as breathing vents or holes through which atmospheric air can be "inhaled" and "exhaled" from the bellows 9, depending upon whether such is expanded or compressed. The type of material, thickness as well as the form of the bellows 9 is selected such that the bellows in relaxed condition tends to hold both of the plates 5 and 6 in approximate parallelism with one another and that after expansion and after compression it tends by itself to always again assume its original length.

Approximately at the height of the axis of the bellows 9 the plate 7 carries an electric contactor or contact maker composed of the two resilient contact lamellae or blades 15*a* and 15*b* electrically insulated from one another. Of these two contact lamellae 15*a* and 15*b* one, such as lamella 15*a*, is operatively coupled with the schematically depicted automobile battery 50 by means of electric cable 16*a*, the other, namely lamella 15*b*, with the schematically shown brake lights 51 via a similar cable 16*b*, and this either directly or through the agency of a relay. It will be further understood that the contact unit composed of both contact lamellae 15*a* and 15*b* is advantageously connected in parallel with the schematically depicted simultaneously available brake light switch 52 at the brake pedal, so that each of both separately, as well as also collectively, can conduct current to the stop or brake lights 51. A pressure knob or push button 17 formed of electrically insulating material is seated at the plate 6 at the height of the contact location of both contact lamellae 15*a* and 15*b*. This pressure knob 17 presses the contact lamellae 15*a* and 15*b* against one another when plate 6 is sufficiently inclined towards plate 7.

It will be further seen that the plate 5 is connected at the hinge joint 18 in pivotable manner with a rod 19 leading to the gas pedal as well as with the rod 21 leading to the carburetor serving as fuel dosing device. In the exemplary embodiment there are schematically depicted the conditions at the carburetor-engine wherein rod 21 via the articulation joint 22 acts upon a lever 24 rotatable about the shaft 23, lever 24 actuating the throttle valve of the carburetor. The lever 24 is pulled by means of a return spring 25, the other end of which engages with a fixed portion of the engine, against a stop 26, namely into the idle position with closed throttle valve.

Thus, the plate 5 is pneumatically connected through the intermediary of the bellows 9 with the plate 6, the position and movement of which is dependent upon the position and the movement of the plate 5 itself, however, simultaneously also from the momentary, variable degree of filling of the bellows 9. Between both of the plates 5 and 6 the housing portion or base plate 1*a* is provided with a stop member in the form of a pin or spike 1*b* which is upwardly flexed in the direction of bellows 9. This pin or spike 1*b* is composed of a strip which is advantageously cut out from the base plate 1*a* and bent towards the plate 6. Plate 6 pulled by the plate 5 through the agency of the bellows 9 impacts against the spike 1*b*, whereas the plate 5 can continue its movement towards the left. In so doing, the bellows 9 is expanded and the vacuum appearing therein is increased, this bringing about that the bellows 9 will more quickly again suck up air via the breathing vent or vents 14. When shifting into higher speeds by means of the gears of the transmission unit the plate 6 does not normally abut against the spike 1*b* because in the lower speeds little gas is given and the driver only remains for a short period of time in each speed. Thus, the stop lights are not turned on when shifting from a lower into a higher gear.

The movements of the plate 7 are braked by an adjustable or regulatable brake means composed of the members 27 to 30. A brake drum 27 is rigidly connected with the plate 7, and a spring 29 is mounted to the support 28. Spring 29 can be pressed to a lesser or greater extent against the brake drum 27 by means of an adjusting or regulating screw 30, whereby at the point of contact 31 there is exerted a braking force. Pressing of the spring 29 against the brake drum 27 is to be regulated by means of the adjusting screw 30 in such a manner that the resistance to rotation of the plate 7 measured at the height of the pressure knob 17 is larger than the counterpressure of the contact lamellae 15*a* and 15*b* upon the pressure knob 17, and simultaneously smaller than the minimum operating pull of the return spring 25, together with an eventual additional return spring at the gas pedal.

Both of the plates 5 and 7 are articulated with one another by means of a flat, slotted entrainment means 32.

This entrainment means 32 is rockably mounted at one end by means of a pin 33 at the plate 5, at the other end it exhibits an elongated slot 34 into which engages an entrainment pin 35 secured to the plate 7, and this pin can slide in the elongated slot 34. Consequently, the plate 7, together with the contact lamellae 15*a* and 15*b*, the adjustable brake means composed of the elements 27 to 30, with the entrainment means 32 and the pins 33 and 35, forms an adjustably brakable contact which is mainly pushed in the contact direction by means of the pressure knob 17 and is towed or dragged back again in the opposite direction by means of the entrainment means 32. The elongated slot 34 provided at the entrainment means 32 brings about a delayed dragging or towing of the plate 7 with respect to the plates 5 and 6, whereby an appropriate tolerance spacing is obtained between the pressure knob 17 and the contact position of the contact lamellae 15*a* and 15*b*. This spacing or distance primarily serves to prevent illumination of the brake lights when the gas pedal is moved out of a certain driving position, such only being moved back a small amount for the purpose of slightly reducing the speed of the vehicle.

The mode of operation of the described stop or brake light switch arrangement designed according to the teachings of the present invention will now be more fully explained in conjunction with different operating conditions. When quickly braking from medium or high speeds the three plates 5, 6 and 7, prior to release of the gas pedal 20, are inclined towards the left of the drawing. The bellows 9 is sucked full with air at atmospheric pressure and between the pressure knob 17 and contact lamella 15*a* closest thereto there appears a tolerance spacing of several millimeters. The stop or brake light means is thus not ignited. Now, with quick release of the gas pedal 20 it presses with the plate 5 connected thereto, the filled bellows 9 and thereby the plate 6 with the pressure knob 17 towards the right against the plate 7. Since such is braked, as previously explained, the contact lamellae 15*a* and 15*b* are pressed against one another whereby current is conducted to the brake lights 51 and such light-up. Both of the plates 5 and 6 continue their movement to the right whereby their pushing force braces against the plate 7 and this in overcoming the braking force, forces such to move along to the right. Pressure from the left and counterpressure from the right upon the bellows 9 compresses such together, so that the therein contained air is compressed and successively escapes through the breathing vent or vents 14. Rocking of the plate 5 to the right stops when the lever 24 impacts the stop 26, that is when the idle position of the carburetor has been reached. The bellows 9 is still at above atmospheric pressure which successively reduces. If the pressure falls beneath the counterpressure of the resilient contact lamella 15*a* then both of the contact lamellae 15*a* and 15*b* are raised from one another, the current circuit to the stop or brake lights 51 interrupted. Such generally do not extinguish, however, since the foot in the meantime has reached the brake pedal and pressed such down, the feed of current to the brake lights 51 then takes place via the conventional brake light switch 52 associated with the brake pedal. With quick braking, the expulsion of the overpressure in the bellows 9 lasts for about two to three seconds, long enough to change over from the gas pedal to the brake pedal and to press such down.

In the event that a quick braking action is prematurely interrupted and the vehicle again accelerated, then the plates 5, 6 synchronously incline with rod 19 leftwards, moving through an angle from plate 7 and thus opening the circuit and extinguishing the stop lights 51. The plate 7 is pulled leftwards only after the circuit has been opened.

However, if the vehicle is permitted to coast to a stop by slowly letting up on the gas pedal then initially the tolerance spacing is moved through, and then the pressure knob 17 braces itself against the counterpressure of the contact lamella 15*a* without, however, causing such to come into contact with the contact lamella 15*b*, because due to the continuous emptying of the bellows 9 such does not have any force to overcome the spring force of the contact lamella 15*a*. After reaching a certain angle of inclination the left end of the elongated slot 34 impacts against the entrainment pin 35. Consequently, the entrainment means 32 pushes the plate 7 synchronously with the plate 5 in front of it. Practically, from this moment on, the external pressure exerted upon the bellows 9 stops, so that such does not empty further. In this manner there is prevented that the bellows 9 in the eventual subsequent rest condition of the vehicle remains unneecssarily compressed together.

When carrying out a further manner of braking of the vehicle, that is by using its motor as a brake in that generally the gear shift is shifted down one or two gears, there occurs illumination of the brake lights when using the inventive brake light switch, and this is in contrast with the standard brake light switches presently known to the art. Thus, when shifting down into a lower transmission speed the gas pedal 20 is released one or two times, depending upon whether the shifting of gears is effected with or without intermediate gas, whereby, with the exception of very low speeds, the brake lights in each case light-up. As a result, there is overcome the described danger occuring when driving in a column during vehicle braking by means of the motor through using the lower gears, as well as with each braking of the vehicle in this manner at intersections, pedestrian crossings, and so forth.

It should thus be quite apparent from the described examples that by means of the inventive stop or brake light switch individual and mass column collisions can be prevented, or at least their effect strongly reduced.

It will further be understood that the subject matter of the present invention can be constructed by employing similar or known equivalent elements, or the essential elements can be assembled in the same manner with the same purpose; to this end there is thought of in particular mechanical inversions. For instance, as a variant of the fine vent holes 14 these can be replaced by means of a continuously adjustable control or regualting valve. Also the bellows 9 can be replaced with a differently shaped or formed elastic hollow body, for instance by a cylinder having a piston and appropriate breathing or vent valve, with a pressure or traction spring for the return of the piston into its neutral position. Furthermore, it is possible after undertaking manual adaptations to employ a different fluid instead of air for filling the hollow body. Moreover, it is possible to place externally over the vent valve 14 a bag or sack formed of only slightly elastic material which takes-up the air expelled from the bellows 9. In this manner, the vent valve 14 and the hollow compartment is maintained free of dust and other impurities. Furthermore, the entrainment means 32 can also be provided with a slot at pin 33 which extends transverse to the lengthwise direction of the entrainment means 32 and into which the pin 33 slidably engages, whereby the plate 7 can be pushed and pulled at pin 33 without any intermediate articulation and bending. Also, actuation of the plate 5 by the rod can take place by means of a single- or double-acting cable pull, in which case the subsequent installation of the inventive device in vehicles is simplified. Additionally, all necessary components which can be easily mounted upon rotational body shapes can be easily housed in a cylindrical housing, for example the different plates can be mounted in the form of circular control disks upon axial linear support shafts, the entrainment means for instance externally of the cylinder acting through a slot upon the control disks. Further, the inventive device can be combined as a structural unit with the standard brake or stop light switch for the brake pedal.

Finally, it will be appreciated that the components designated by reference numerals 19 to 26 are not elements of the inventive device, rather conventional structural elements of carburetor-engines. They have only been depicted in the drawing in order to more fully illustrate the assembly and to elucidate the manner of operation of the inventive structure.

While there is shown and described present preferred embodiments of the invention it is to be distinctly understood that the invention is not limited thereto but may be otherwise variously embodied and practiced within the scope of the following claims.

What is claimed is:

1. Stop-light control for automobiles, including: a housing portion; a first support the position of which is responsive to the movement of the accelerator pedal of the automobile and which is mounted for movement with respect to said housing portion; a second support spaced from said first support in the direction of movement of said first support when the accelerator is released and which is mounted for movement with respect to said housing portion; entraining means connecting together said first and second supports for permitting a degree of relative movement therebetween and to cause one support to move in response to the other once the degree of relative movement has been exceeded; adjustable brake means for providing an adjustable constant resistance to movement of said second support; a switch associated with said second support and located between said first and second supports, for series connection in the stop-light circuit of the automobile; pneumatic means of variable length located intermediate said first and second supports, one end of said pneumatic means being fixed to said first support and the other end facing said switch, said pneumatic means at least indirectly causing closing of said switch upon sufficient movement of said first support towards said second support.

2. A stop-light control as defined in claim 1, including a third support located intermediate said switch and said pneumatic means and in air-tight contact with said other end of the pneumatic means and which is mounted for movement with respect to said housing portion.

3. A stop-light control as defined in claim 2, wherein said pneumatic means is an expandable and compressible hollow body comprising an air-tight wall, and valve means located in said wall.

4. A stop-light control as defined in claim 3, wherein said expandable and compressible hollow body is a bellows, said valve means comprising at least one opening in said bellows.

5. A stop-light control as defined in claim 4, wherein the internal pressure in said bellows increases when said first support moves towards said second support and said switch is closed by the pressure exerted by the bellows and opens when that pressure falls below a predetermined level, and wherein said internal pressure for slow movement of said first support means towards said second support means remains below said predetermined level.

6. A stop-light control as defined in claim 5, including a switch for series connection in the stop-light circuit of the motorcar and actuated by the brake pedal, said two switches being connected in parallel.

7. A stop-light control as defined in claim 6, including a stationary stop member located between said first and third supports, for limiting the movement of said third support towards said first support.

8. A stop-light control as defined in claim 2, including an individual pivot for each of said first, second and third supports connecting said supports to said housing portion, said supports pivoting through angles lying at least approximately in a common plane.

9. A stop-light control as defined in claim 8, wherein said entraining means comprises a link defining two ends; means pivotally connecting one end of the link to said first support; a slot in the other end of said link extending in the direction of pivoting movement of said first and second supports; and a pin fixed on said second support and located in said slot for movement therein when said second support pivots.

10. A stop-light control as defined in claim 4, including a button on said third support and located between the support and said switch associated with the second support, for actuating said switch.

References Cited by the Examiner

UNITED STATES PATENTS 2,602,144 7/1952 Bolles ------------ 200—83 X

BERNARD A. GILHEANY, *Primary Examiner.*

J. BAKER, *Assistant Examiner.*